(12) United States Patent
Cook

(10) Patent No.: US 10,845,582 B2
(45) Date of Patent: Nov. 24, 2020

(54) ALL-REFLECTIVE SOLAR CORONAGRAPH SENSOR AND THERMAL CONTROL SUBSYSTEM

(71) Applicant: RAYTHEON COMPANY, Waltham, MA (US)

(72) Inventor: Lacy G. Cook, El Segundo, CA (US)

(73) Assignee: RAYTHEON COMPANY, Waltham, MA (US)

( * ) Notice: Subject to any disclaimer, the term of this patent is extended or adjusted under 35 U.S.C. 154(b) by 289 days.

(21) Appl. No.: 16/002,387

(22) Filed: Jun. 7, 2018

(65) Prior Publication Data
US 2019/0377169 A1    Dec. 12, 2019

(51) Int. Cl.
*G02B 23/02* (2006.01)
*G02B 17/02* (2006.01)
(Continued)

(52) U.S. Cl.
CPC ....... *G02B 17/023* (2013.01); *G02B 17/0663* (2013.01); *G02B 26/0833* (2013.01); *G02B 27/0081* (2013.01)

(58) Field of Classification Search
CPC . B64G 1/105; B64G 1/50; B64G 1/66; B64G 2001/1057; G02B 17/006; G02B 17/008; G02B 17/023; G02B 17/0657; G02B 23/02; G02B 23/06; G02B 27/1066; G02B 27/143; G02B 5/003; G02B 7/181; G02B 7/1815; G02B 27/141; G02B 17/00; G02B 17/02; G02B 27/10; G02B 27/14;
(Continued)

(56) References Cited

U.S. PATENT DOCUMENTS

| 3,748,015 A | 7/1973 | Offner |
| 3,752,559 A * | 8/1973 | Fletcher ................. G02B 23/00 359/503 |

(Continued)

FOREIGN PATENT DOCUMENTS

EP    2916157 B1    8/2016

OTHER PUBLICATIONS

Vives, "Demonstrator of the formation flying solar coronagraph", Aug. 10, 2010 (Year: 2010).*

(Continued)

*Primary Examiner* — Balram T Parbadia
(74) *Attorney, Agent, or Firm* — Lando & Anastasi, LLP

(57) ABSTRACT

An coronagraph optical system and method for continuously imaging a wide field of view that includes the Sun. Examples of the coronagraph optical system include an all-reflective foreoptics assembly that receives light rays from a viewed scene and a direct solar image of the Sun, a sensor assembly configured to produce an image of the viewed scene, an all-reflective relay optics assembly configured to receive the light rays from the foreoptics assembly and to reflect the light rays to the sensor assembly, and a solar rejection optical component positioned between the foreoptics assembly and the relay optics assembly and dynamically configurable such that the direct solar image of the Sun is reflected away from the relay optics assembly and the light rays are reflected to the relay optics assembly while an entrance aperture of the foreoptics assembly is continuously positioned towards the Sun.

13 Claims, 12 Drawing Sheets

(51) Int. Cl.
*G02B 17/06* (2006.01)
*G02B 26/08* (2006.01)
*G02B 27/00* (2006.01)

(58) Field of Classification Search
CPC . G02B 7/18; H04N 5/225; H04N 5/33; H04N 5/2254; H04N 5/332
See application file for complete search history.

(56) References Cited

U.S. PATENT DOCUMENTS

| | | | |
|---|---|---|---|
| 4,240,707 A | 12/1980 | Wetherell et al. | |
| 4,923,293 A | 5/1990 | Nelles et al. | |
| 5,078,502 A | 1/1992 | Cook | |
| 5,331,470 A | 7/1994 | Cook | |
| 5,404,869 A * | 4/1995 | Parkyn, Jr. | G02B 27/09 |
| | | | 126/699 |
| 5,608,526 A | 3/1997 | Piwonka-Corle et al. | |
| 6,178,047 B1 | 1/2001 | Cook | |
| 7,130,051 B2 | 10/2006 | Oppenheimer et al. | |
| 7,236,289 B2 * | 6/2007 | Baek | G02B 26/04 |
| | | | 348/E5.028 |
| 7,715,099 B2 | 5/2010 | Shih | |
| 7,784,740 B2 * | 8/2010 | Massonnet | G02B 27/58 |
| | | | 244/171.1 |
| 8,280,104 B2 | 10/2012 | Deforest | |
| 8,714,760 B2 | 5/2014 | Cook | |
| 8,743,457 B2 | 6/2014 | Sivaramakrishnan et al. | |
| 9,396,294 B1 * | 7/2016 | Lyon | G02B 23/12 |
| 9,523,516 B2 * | 12/2016 | Hebrink | F24S 23/82 |
| 2004/0156087 A1 * | 8/2004 | Oppenheimer | G02B 5/005 |
| | | | 359/244 |
| 2006/0139731 A1 * | 6/2006 | Baek | H04N 5/238 |
| | | | 359/291 |
| 2007/0286461 A1 | 12/2007 | Deforest | |
| 2008/0297909 A1 * | 12/2008 | Comstock, II | G02B 5/08 |
| | | | 359/601 |
| 2010/0127113 A1 * | 5/2010 | Taylor | F41G 7/2253 |
| | | | 244/3.16 |
| 2010/0172014 A1 * | 7/2010 | Kanade | H04N 9/3158 |
| | | | 359/291 |
| 2012/0257275 A1 * | 10/2012 | Hull | G02B 23/16 |
| | | | 359/399 |
| 2012/0268836 A1 | 10/2012 | Mercado | |
| 2013/0335839 A1 * | 12/2013 | Cook | G02B 17/0636 |
| | | | 359/857 |
| 2017/0359495 A1 * | 12/2017 | Hawes | H04N 5/2254 |
| 2018/0045932 A1 * | 2/2018 | Hill | G02B 21/16 |
| 2018/0224642 A1 | 8/2018 | Cook et al. | |

OTHER PUBLICATIONS

International Search Report and Written Opinion in application No. PCT/US2019/025971 dated Aug. 5, 2019.

Cross, Eugene W. Jr. "Eccentric pupil reflecting telescope development", Lens Design: A Critical Review (1992) vol. 10263, pp. 225-267.

Papushev et al. "Development and produce of ground-based reflecting coronagraph for solar applications", Ground-based and Airborne Instrumentation for Astronomy IV (2012) vol. 8446, pp. 84466U-1-84466U-13.

Zamkotsian et al. "Optical MEMS in space instruments for Earth Observation and Astronomy", MOEMS and Miniaturized Systems XII (2013) vol. 8616, pp. 861618-1-14.

Kühn et al. "Digital Adaptive Coronagraphy using SLMs: Promising Prospects of a Novel Approach, including High-Contrast Imaging of Multiple Stars Systems", Advances in Optical and Mechanical Technologies for Telescopes and.Instrumentation II (2016) vol. 9912, pp. 9912M-1-12.

Cady et al. "Demonstration of high contrast with an obscured aperture with the WFIRST-AFTA shaped pupil coronagraph", Journal of Astronomical Telescopes, Instruments, and Systems (2016) vol. 2, No. 1, pp. 011004-1-12.

Mendillo et al. "Optical tolerances for the PICTURE-C mission: error budget for electric field conjugation, beam walk, surface scatter, and polarization aberration", Techniques and Instrumentation for Detection of Exoplanets VIII (2017) vol. 10400, pp. 1040010-1-17.

* cited by examiner

ALL-REFLECTIVE SOLAR CORONAGRAPH SENSOR AND THERMAL CONTROL SUBSYSTEM

BACKGROUND

Sensing objects close to a solar line of sight (e.g., near the Sun) with a wide field of view and for long periods of time is problematic because conventional telescope optical systems cannot tolerate the extreme solar thermal load on components of the system. As a result, they suffer very significant image quality degradation due to optics misalignments and distortion of the optical surfaces, and thus become unsuitable for their intended purposes.

Existing coronagraphs can sense objects close to the Sun in a narrow field of view and a narrow spectral band, typically for only a transient period of time because the solar thermal load is too intense for the components of the coronagraph to effectively sense the objects without problematic degradation. Such coronagraphs typically implement a significant shield or baffle to block-out a direct solar image of the Sun. Thus, they suffer the restriction of not being able to view certain objects very near the Sun.

SUMMARY OF THE INVENTION

Aspects and embodiments are directed to a coronagraph optical system that includes an all-reflective optical path and a dynamically controllable solar rejection optical component (e.g., a micromirror array) that can adjust to varying positions of the Sun within the field-of-view of the system, allowing for continuous imaging of objects positioned close to the Sun.

According to one embodiment a coronagraph optical system for continuously imaging a wide field of view includes an all-reflective foreoptics assembly having an entrance aperture positionable towards the Sun and configured to receive light rays over the wide field of view, the all-reflective foreoptics assembly including a plurality of foreoptics mirrors that receive the light rays via the entrance aperture and sequentially reflect the light rays, the light rays including first light rays from a viewed scene and second light rays corresponding to a direct solar image of the Sun, a sensor assembly including at least one photosensitive detector and configured to produce an image of the viewed scene based on the first light rays, an all-reflective relay optics assembly configured to receive the first light rays from the all-reflective foreoptics assembly and to reflect the first light rays to the sensor assembly, and a solar rejection optical component positioned between the all-reflective foreoptics assembly and the all-reflective relay optics assembly and dynamically configurable such that the direct solar image of the Sun, reflected by the all-reflective foreoptics assembly to the solar rejection optical component, is reflected away from the all-reflective relay optics assembly and the first light rays are reflected to the all-reflective relay optics assembly while the entrance aperture of the all-reflective foreoptics assembly is continuously positioned towards the Sun.

In one example the wide field of view is between 5 degrees and 30 degrees.

In one example the all-reflective foreoptics assembly is a reflective triplet and the plurality of foreoptics mirrors consists of a primary mirror that receives the light rays from the entrance aperture and reflects the light rays, a secondary mirror that receives the light rays reflected from the primary mirror and reflects the light rays, and a tertiary mirror that receives the light rays reflected from the secondary mirror and reflects the light rays to the solar rejection optical component.

In another example the plurality of foreoptics mirrors consists of a primary mirror that receives the light rays from the entrance aperture and reflects the light rays, a secondary mirror that receives the light rays reflected from the primary mirror and reflects the light rays, a tertiary mirror that receives the light rays reflected from the secondary mirror and reflects the light rays, and a quaternary mirror that receives the light rays reflected from the tertiary mirror and reflects the light rays to the solar rejection optical component.

In one example the all-reflective relay optics assembly is a five-reflection finite conjugate relay system.

In one example the solar rejection optical component includes a dynamically controllable micromirror array. The dynamically controllable micromirror array may include a plurality of micromirrors, each micromirror being individually controllable between a first position in which incident light is reflected in a first direction and a second position in which the incident light is reflected in a second direction, there being a predetermined angular separation between the first direction and the second direction. In one example the solar rejection component further includes a controller coupled to the dynamically controllable micromirror array and to the sensor assembly, the controller being configured to dynamically switch individual ones of the plurality of micromirrors between the first position and the second position based on information received from the sensor assembly so as to reflect the direct solar image of the Sun away from the all-reflective relay optics assembly while the entrance aperture of the all-reflective foreoptics assembly is continuously positioned towards the Sun.

The coronagraph optical system may further include a thermal control subsystem coupled to the all-reflective foreoptics assembly, the thermal control subsystem transferring away heat such that the entrance aperture can be continuously positioned towards the Sun. In one example the thermal control subsystem includes a plurality of heat transfer shrouds, each heat transfer shroud radiatively coupled to one of the plurality of foreoptics mirrors for transferring the heat. The coronagraph optical system may further comprise an optical bench containing the plurality of foreoptics mirrors and at least one cold-bias heat pipe, wherein the thermal control subsystem includes a plurality of heat transfer members each thermally coupled to one of the heat transfer shrouds and to the optical bench, and wherein the plurality of heat transfer members are thermally coupled to the at least one cold-bias heat pipe. In one example the plurality of foreoptics mirrors and the optical bench are each comprised of a low thermal expansion material selected from the group consisting of silicon carbide, low expansion glass, and low expansion composite. In another example the thermal control subsystem further includes a plurality of heaters thermally coupled to each of the plurality of foreoptics mirrors for controlling a temperature of the all-reflective foreoptics assembly. The thermal control subsystem may include a thermal management component coupled to the solar rejection optical component.

In one example the at least one photosensitive detector includes at least one of a longwave infrared focal plane array and a visible focal plane array.

Another embodiment is directed to a method of imaging a viewed scene that includes the Sun, the method including acts of positioning an entrance aperture of an all-reflective foreoptics assembly towards the Sun, receiving at the all-reflective foreoptics assembly, via the entrance aperture, light rays from the viewed scene and a direct solar image of the Sun, reflecting the light rays and the direct solar image of the Sun from the all-reflective foreoptics assembly to a solar rejection optical component, dynamically controlling the solar rejection optical component to reflect the light rays to an all-reflective relay optics assembly and to reflect the direct solar image of the Sun away from the all-reflective relay optics assembly while the entrance aperture of the foreoptics assembly is positioned towards the Sun, reflecting the light rays from the relay optics assembly to a sensor assembly, and with the sensor assembly, producing an image of the viewed scene from the light rays.

In one example the solar rejection optical component includes a micromirror array formed of a plurality of micromirrors, and dynamically controlling the solar rejection optical component includes dynamically switching individual ones of the plurality of micromirrors between a first position in which incident light is reflected towards the all-reflective relay optics assembly and a second position in which the incident light is reflected away from the all-reflective relay optics assembly.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Figure 1:
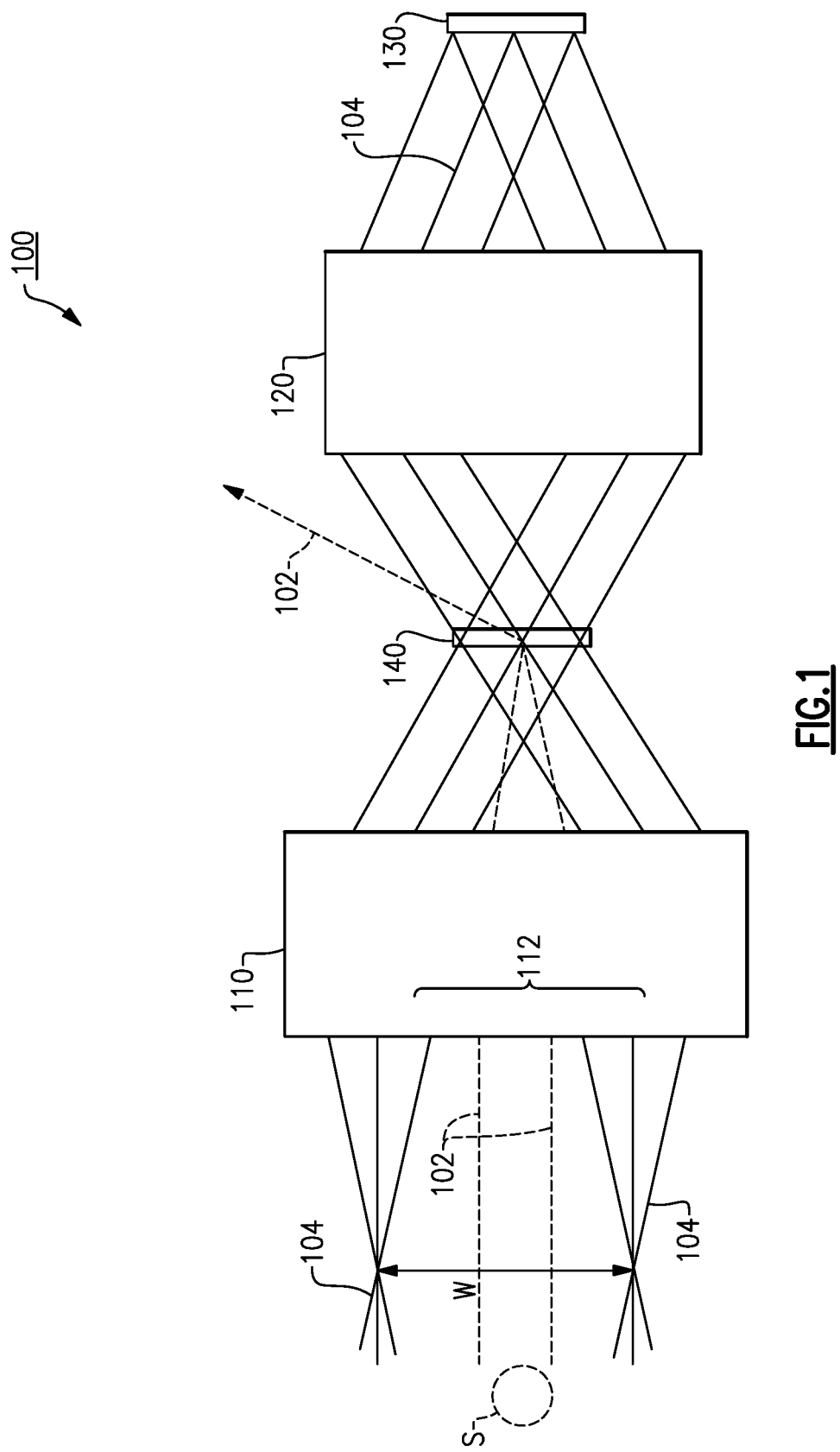
FIG. 1 is a block diagram of one example of a coronagraph optical system in accordance with aspects of the present invention.

Aspects and embodiments are directed to an all-reflective solar coronagraph that includes a thermal control subsystem and is configured to continuously image objects, optionally in two spectral bands (e.g., infrared and visible), located as close as 0.5 degrees to the Sun. Embodiments of the solar coronagraph includes an all-reflective relayed optical path, a sensor assembly that may include a visible photosensitive detector (e.g., a focal plane array) and an infrared photosensitive detector, and thermal control subsystem that rejects the direct solar image of the Sun and radiatively exhausts the thermal loads from the mirrors to peripheral radiator panels. As discussed further below, a MEMS-based digital micromirror device (DMD) can be used to reject the solar image. The DMD can be dynamically controlled such that the direct solar image can be rejected with the Sun anywhere in the field-of-view, thereby removing any need for the center of the field of view of the solar coronagraph to be centered on the Sun.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting.

Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation. As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. As used herein, the term "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

FIG. 1 illustrates an example of a coronagraph optical system 100 that can be configured for continuously imaging a wide field of view W. The optical system 100 includes a foreoptics assembly 110 having an entrance aperture 112 that can be positioned towards the Sun S (a direct image of the Sun is represented by dashed lines 102). As used herein, a "wide field of view" refers to a field of view that is at least 2-3 degrees, in some cases at least 5 degrees, and in other cases at least 10 degrees, and may be up to 20-30 degrees. The foreoptics assembly 110 can include a plurality of optical components, (e.g., mirrors, lenses, or a combination of both) that receive and direct light rays 104 over the field of view W. In FIG. 1, the image of the Sun S is shown approximately centered in the field of view W; however, as discussed further below, this need not be the case and in some instances the image of the Sun S will be off center in the field of view W. The optical system 100 further includes a relay optics assembly 120 that can be configured to direct the light rays 104 to a sensor assembly 130. The sensor assembly 130 may include at least one imaging sensor (e.g., one or more photodiodes and associated circuitry) configured to produce an image of a scene viewed through the field of view W. The relay optics assembly 120 can include one or more optical components (e.g., mirrors, lenses, or a combination of both) that receive the light rays 104 from the foreoptics assembly 110 and focus the light rays 104 onto the sensor assembly 130.

According to certain embodiments, a solar rejection optical component 140 is positioned between the foreoptics assembly 110 and the relay optics assembly 120. The solar rejection optical component 140 functions to direct the image of the Sun S, represented by light rays 102, away from the relay optics assembly 120 and the sensor assembly 130, as shown in FIG. 1. In certain examples, the solar rejection optical component 140 is positioned substantially at an intermediate image plane of the optical system 100, that is, at the foreoptics assembly image, such that the direct solar image of the Sun S (represented by light rays 102) is incident on the solar rejection optical component 140 while the Sun is in the field of view W of the foreoptics assembly 110. As discussed further below, in certain embodiments, the solar rejection optical component 140 includes a spatial light modulator configured to reflect the direct solar image light rays 102 to a particular location (away from the relay optics assembly 120 and the sensor assembly 130) and to reflect all other light rays 104 towards the relay optics assembly 120. In one example the spatial light modulator is a controllable digital mirror device (DMD). The DMD can be controlled to dynamically adapt to varying positions of the direct image of the Sun S within the field of view W. As also discussed further below, in certain examples, a thermal control system (not shown in FIG. 1) can be incorporated to control the temperature of the coronagraph optical system 100, thereby facilitating the entrance aperture of the foreoptics assembly 110 to be continuously open and positioned towards the Sun S.

According to certain embodiments, the coronagraph optical system 100 of FIG. 1 (and the examples of coronagraph optical systems described below) can be an all-reflective telescope coronagraph with a low f-number (i.e., a "fast" optical system). The f-number (sometimes called focal ratio, f-ratio, f-stop, or relative aperture) of an optical system is the ratio of the lens's focal length to the diameter of the entrance pupil. It is a dimensionless number that is a quantitative measure of light gathering ability. An all-reflective system has the advantage over refractive or partially refractive systems (i.e., those including one or more lenses) of not being spectrally limited, which means that it is capable of imaging any wavelength band. Moreover, the coronagraph optical systems discussed herein can continuously image a wide field of view (e.g., between 5 degrees and at least 30 degrees, or more) while reflecting short and long wave imaging to the sensor assembly 130. This is a significant improvement and advantage over conventional coronagraphs that can only image a narrow field of view (e.g., about 1-2 degrees) and a narrow spectral band, and typically for only a transient period of time (e.g., a few seconds or minutes). As further discussed herein, "continuously" viewing (a wide field of view) means that the disclosed systems can image objects near the Sun for many hours, weeks, or even indefinitely, in a steady state without suffering meaningful degradation of system components. This advantage is achieved and provided for by examples of the coronagraph optical systems discussed herein.

All-reflective embodiments of the foreoptics assembly 110 and the relay optics assembly 120 can have a variety of different optical forms. Certain examples are discussed below and shown in the drawings; however, those skilled in the art will appreciate, given the benefit of this disclosure, that other examples of the foreoptics assembly 110 and the relay optics assembly 120 may be implemented in accord with the principles and objectives disclosed herein.

Figure 2:
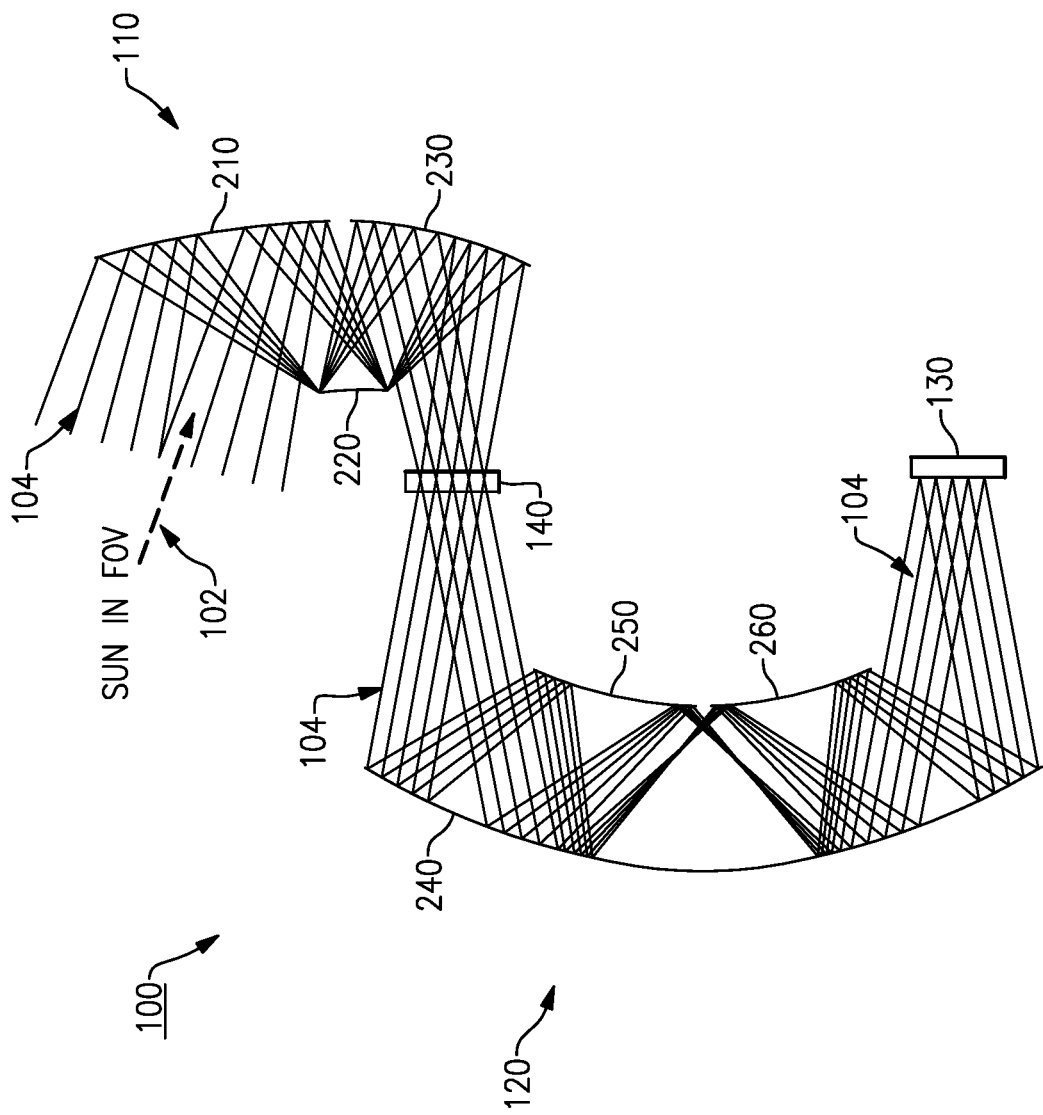
FIG. 2 is a partial ray trace of one example of a coronagraph optical system in accordance with aspects of the present invention.

Referring to FIG. 2 there is illustrated a partial ray trace of one example of the coronagraph optical system 100 in which the foreoptics 110 is implemented using a reflective triplet optical form. In this example, the foreoptics assembly 110 includes a primary mirror 210, a secondary mirror 220, and a tertiary mirror 230. The incident light rays 104 and 102 are received at the primary mirror 210, reflected from the primary mirror 210 to the secondary mirror 220, and reflected from the secondary mirror 220 to the tertiary mirror 230. The light rays 104, 102 are further reflected from the tertiary mirror 230 to the solar rejection optical component 140, which may be positioned at an intermediate image plane formed by the foreoptics assembly 110 between the foreoptics assembly 110 and the relay optics assembly 120, as shown in FIG. 2. The relay optics assembly 120 reflects the light rays 104 to the sensor assembly 130. In one example, the reflective triplet forming the foreoptics assembly 110 shown in FIG. 2 may have a 10×10 degree field of view, an optical speed of F/3.0, an effective focal length of 6.69 centimeters (cm), and an entrance aperture of 2.23 cm in diameter. As will be appreciated by those skilled in the art, given the benefit of this disclosure, numerous other optical configurations of the reflective triplet, which may have different optical characteristics/parameters from the example give above, may be implemented and used for the foreoptics assembly 110.

In one example, the relay optics assembly 120 includes an all-reflective, five-reflection finite conjugate relay system, as shown in FIG. 2. In the illustrated example, the light rays 104 are reflected from a first mirror 240 to a second mirror 250, reflected from the second mirror to the third mirror 260, then reflected to a fourth mirror 270, and reflected from the fourth mirror 270 to the fifth mirror 280, from where they are reflected and focused onto to the sensor assembly 130. In this example the first, third, and fifth reflections can be from different regions of a common mirror substrate (e.g., the first mirror 240); however, those skilled in the art will readily appreciate that the mirror 240 may instead be implemented as two or three individual mirrors rather than a single mirror. Similarly, in the illustrated example, the second and fourth reflections are from separate mirrors, namely second mirror 250 and fourth mirror 270, respectively; however, those skilled in the art will readily appreciate that the mirrors 250 and 270 may instead be replaced with a single mirror substrate configured to accommodate both reflections. Examples of a five-reflection finite conjugate relay system that can be used as the relay optics assembly 120 are described in U.S. PG-Publication No. US-2017-0329113-A1 to Lacy G. Cook, which is incorporated herein by reference in its entirety for all purposes. In other examples, the relay optics assembly 120 may be implemented using a different all-reflective optical form and is not limited to a five-reflection system.

The sensor assembly 130 of the coronagraph optical system 100 can include different types of sensors, such as a longwave infrared focal plane array, or a visible band focal plane array. The visible band focal plane array may be of the silicon-pin type, while the longwave infrared focal plane array may be of the silicon microbolometer type, for example. In certain examples, the sensor assembly 130 may include multiple sensors, for example to provide the capability to simultaneously image in different spectral bands. In such examples, the sensor assembly 130 may include a beamsplitter (not shown) positioned in the path of the light rays 104 reflected from the relay optics assembly 120.

Figure 3:
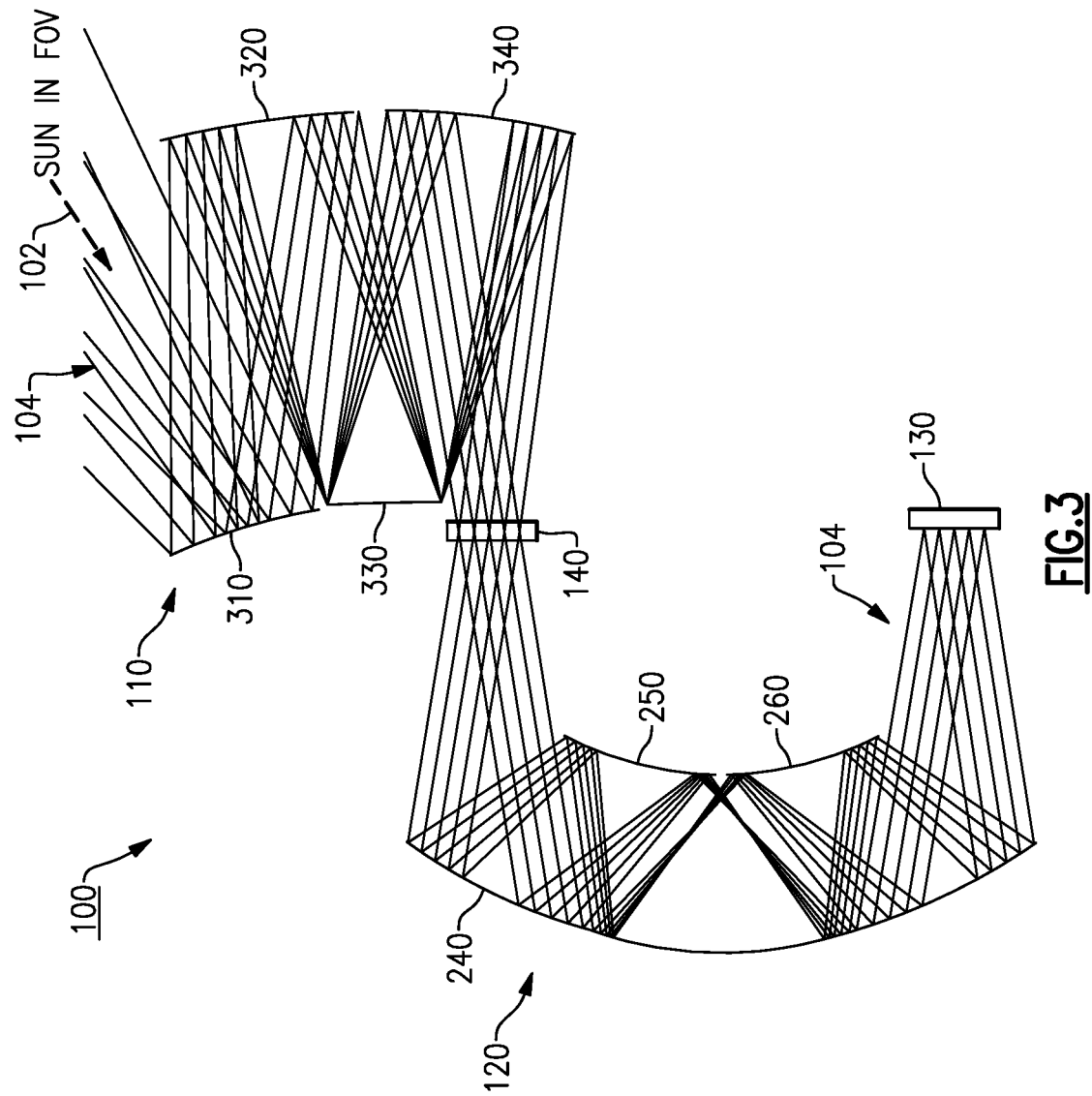
FIG. 3 is a partial ray trace of another example of a coronagraph optical system in accordance with aspects of the present invention.

FIG. 3 illustrates a partial ray trace of another example of the coronagraph optical system 100 in which the foreoptics assembly 110 is implemented using a WALRUS-folded-type optical form. In this example, the incident light rays 104 and 102 are received at a primary mirror 310, reflected from the primary mirror 310 to a secondary mirror 320, reflected from the secondary mirror 320 to a tertiary mirror 330, and reflected from the tertiary mirror 330 to a quaternary mirror 340. The light rays 104, 102 are further reflected from the quaternary mirror 340 to the solar rejection optical component 140, which may be positioned at an image plane formed by the foreoptics assembly 110 as discussed above. An example of a WALRUS-folded-type foreoptics assembly 110 is described in U.S. Pat. No. 5,331,470 to Lacy G. Cook, which is incorporated herein by reference in its entirety for all purposes. In one example the WALRUS-folded-type system forming the foreoptics assembly 110 shown in FIG. 3 may have a 20×20 degree field of view, an optical speed of F/3.0, an effective focal length of 3.34 cm, and an entrance aperture that is 1.11 cm in diameter. As will be appreciated by those skilled in the art, given the benefit of this disclosure, numerous other optical configurations of the foreoptics assembly 110 can be implemented and may have different optical characteristics/parameters from the example give above. In the example of the coronagraph optical system 100 illustrated in FIG. 3, the relay optics assembly 120 is implemented using the same all-reflective, five-reflection optical system shown in FIG. 2 and discussed above. As noted above, the relay optics assembly 120 may alternatively be implemented using a different reflective optical form and is not limited to the example shown in FIGS. 2 and 3.

As discussed above, the solar rejection optical component 140 may be positioned between the foreoptics assembly 110 and the relay optics assembly 120 at the image plane formed by the foreoptics assembly 110. The solar rejection optical component 140 is configurable to direct the light rays 104 to the relay optics assembly 120 and to direct the image of the Sun represented by light rays 102 away from the relay optics assembly 120 while the entrance aperture 112 of the foreoptics assembly 110 can be continuously positioned towards the Sun S. In certain embodiments, the solar rejection optical component 140 can be implemented using a dynamically controllable micromirror array or other type of spatial light modulator. Using a dynamically controllable micromirror array may provide advantages such as the ability to dynamically adjust to varying positions of the Sun, S, within the field of view, W, such that it is not necessary to keep the entrance aperture 112 centered on the Sun.

Figure 4:
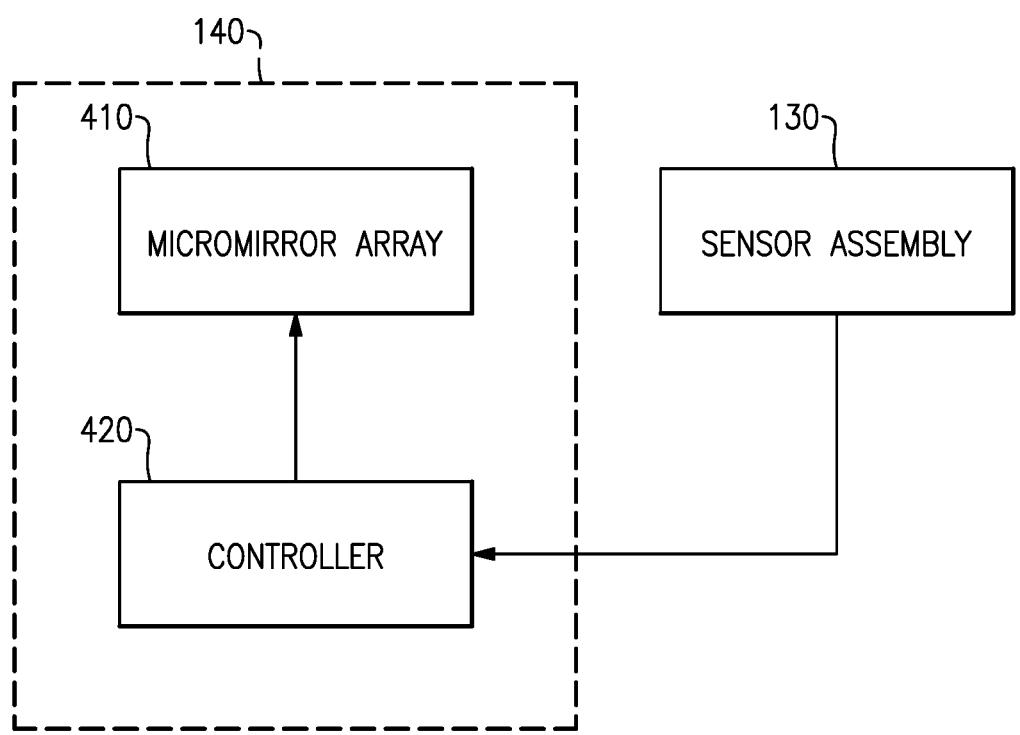
FIG. 4 is a block diagram of a portion of a coronagraph optical system including a solar rejection optical component according to aspects of the present invention.
Figure 5:
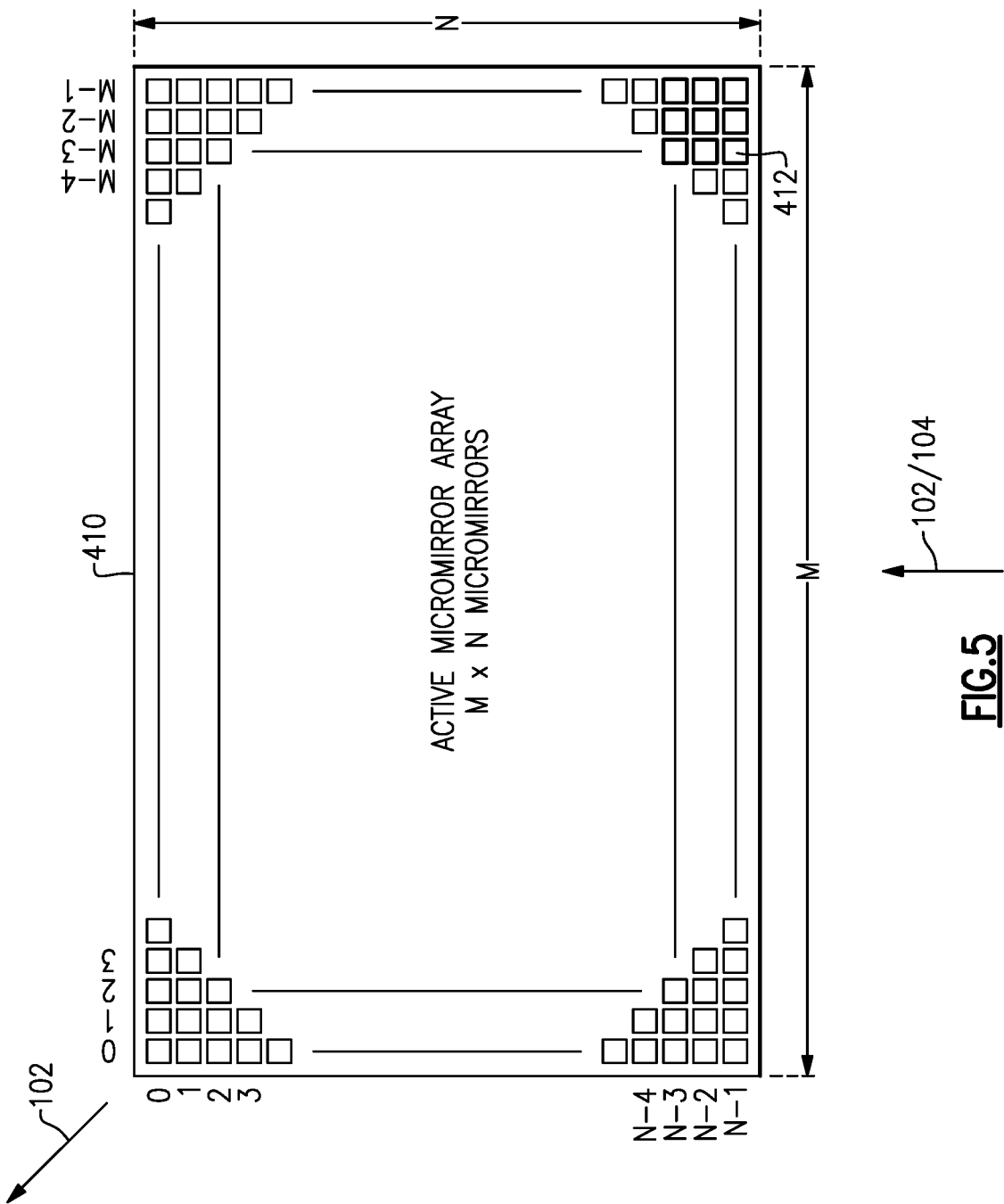
FIG. 5 is a diagram of one example of a digital micromirror array that can be used in the solar rejection optical component according to aspects of the present invention.

Referring to FIG. 4 there is illustrated a block diagram of one example of the solar rejection component 140 including dynamically controllable micromirror array 410 and a controller 420 that controls the micromirror array 410. FIG. 5 is a block diagram showing an example of the micromirror array 410. The micromirror array 410 includes a plurality of micromirrors 412, which may be each individually controllable by controller 420. In the example shown in FIG. 5, the plurality of micromirrors 412 are arranged in an M by N rectangular grid pattern (M and N being integer numbers); however, in other examples the micromirrors 412 can be arranged in a different pattern (e.g., truncated rectangle, circle, hexagon, etc., or other regular or irregular patterns). According to certain embodiments, responsive to control signals from the controller 420, each individual micromirror 412 can be tilted, rotated, or otherwise shifted between a first position in which it reflects incident light in a first direction (or at a first angle relative to the angle of incidence of the light on the micromirror 412) and a second position in which it reflects the incident light in a second direction (or at a second angle relative to the angle of incidence of the light on the micromirror 412). Thus, because different micromirrors 412, and therefore different regions of the micromirror array 410, can be made to reflect incident light at different angles or in different directions, the micromirror array 410 can be used to direct the light rays 104 (representing a viewed scene) toward the relay optics assembly 120, while directing the light rays 102 (representing the image of the Sun) in a different direction, as discussed above. An illustration of this is shown in FIG. 6A.

Figure 6A:
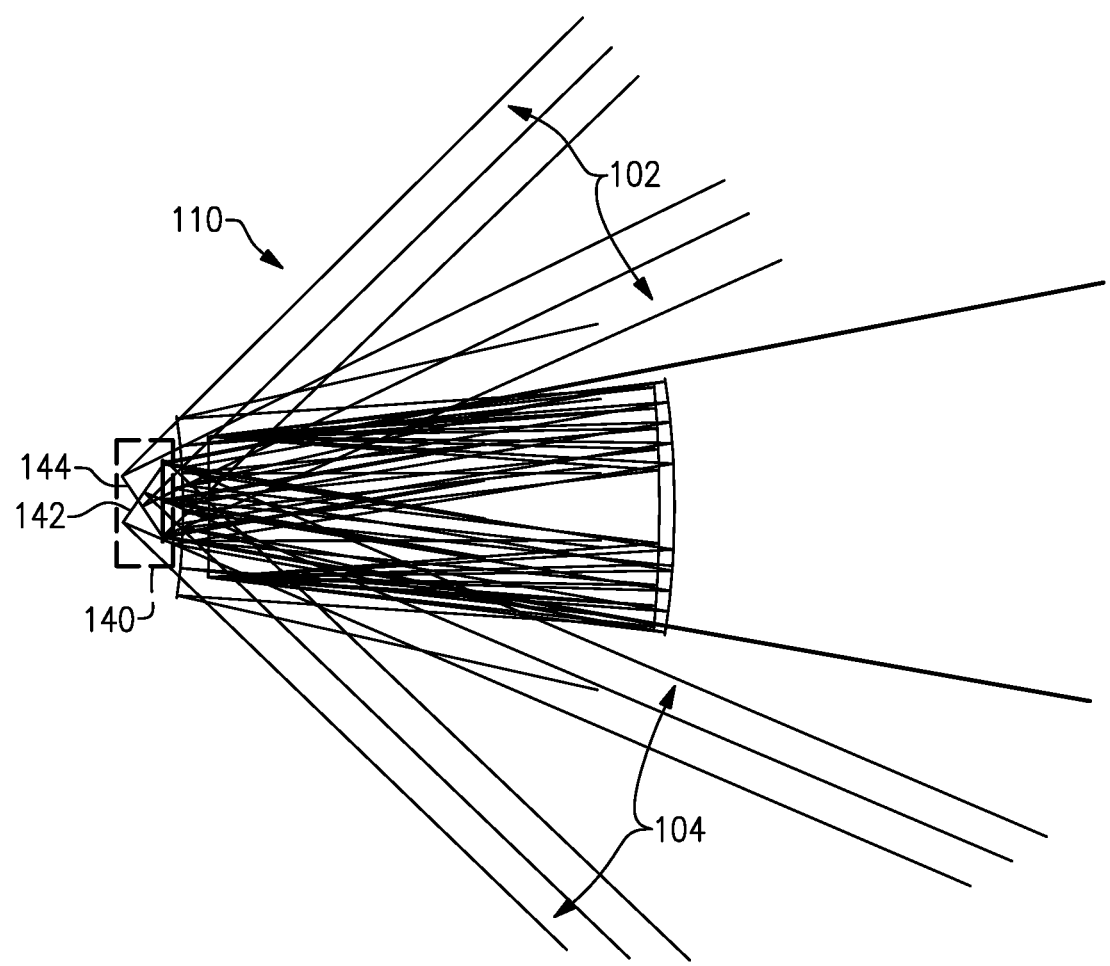
FIG. 6A is a partial ray trace showing operation of an example of the digital micromirror array according to aspects of the present invention.

Specifically, as shown in FIG. 6A, micromirrors 412 that are controlled by the controller 420 to be in the first position (represented by line 142) reflect the light rays 104 in a first direction, whereas micromirrors 412 that are controlled by the controller 420 to be in the second position (represented by line 144) reflect the light rays 102 in a different direction. In one example, the micromirrors 412 are tilted (relative to a "flat" position in which the surface of the micromirror is perpendicular to a central optical axis of the incident light) by a specified number of degrees + or − in the first and second positions, respectively (or vice versa). For example, the micromirrors may be tilted +17 degrees in the first position and −17 degrees in the second position, or vice versa. In this example, the light rays 104 are deflected by +34 degrees, whereas the light rays 102 are deflected by −34 degrees, resulting in an angular separation of 68 degrees between direction of the light rays 104 and the direction of the light rays 102. In certain examples, the controller 420 can control the tilt of the micromirrors 412 by applying a voltage to each individual micromirror to determine whether the micromirror is in the first position or the second position.

In one example, the solar rejection optical component can include a digital micro-mirror device (DMD) available under part number DLP660TE from Texas Instruments. The DLP660TE DMD is a digitally controlled micro-opto-electromechanical system (MOEMS) spatial light modulator (SLM) that enables bright, affordable full 4K Ultra High Definition (UHD) display solutions. When coupled to an appropriate optical system, the DLP660TE DMD displays true 4K UHD resolution (8.3m pixels on screen) and is capable of delivering accurate, detailed images to a variety of surfaces. The DLP660TE DMD, together with the DLPC4422 display controller and DLPA100 power and motor driver (also available from Texas Instruments), comprise the DLP® 4K UHD chipset, which can be used as the solar rejection optical component 140 in certain examples. The DLP® 4K UHD chipset includes a 0.66 inch diagonal micro-mirror array that displays 4K UHD 3840×2160 pixels on the screen. The DLP660TE DMD has a 5.4 micron micro-mirror pitch and ±17° micro-mirror tilt (relative to a flat surface) with bottom illumination. The DLP® 4K UHD chipset further includes a 2×LVDS input data bus, and a dedicated DLPC4422 display controller and DLPA100 power management integrated circuit and motor driver for reliable operation.

Figure 6B:
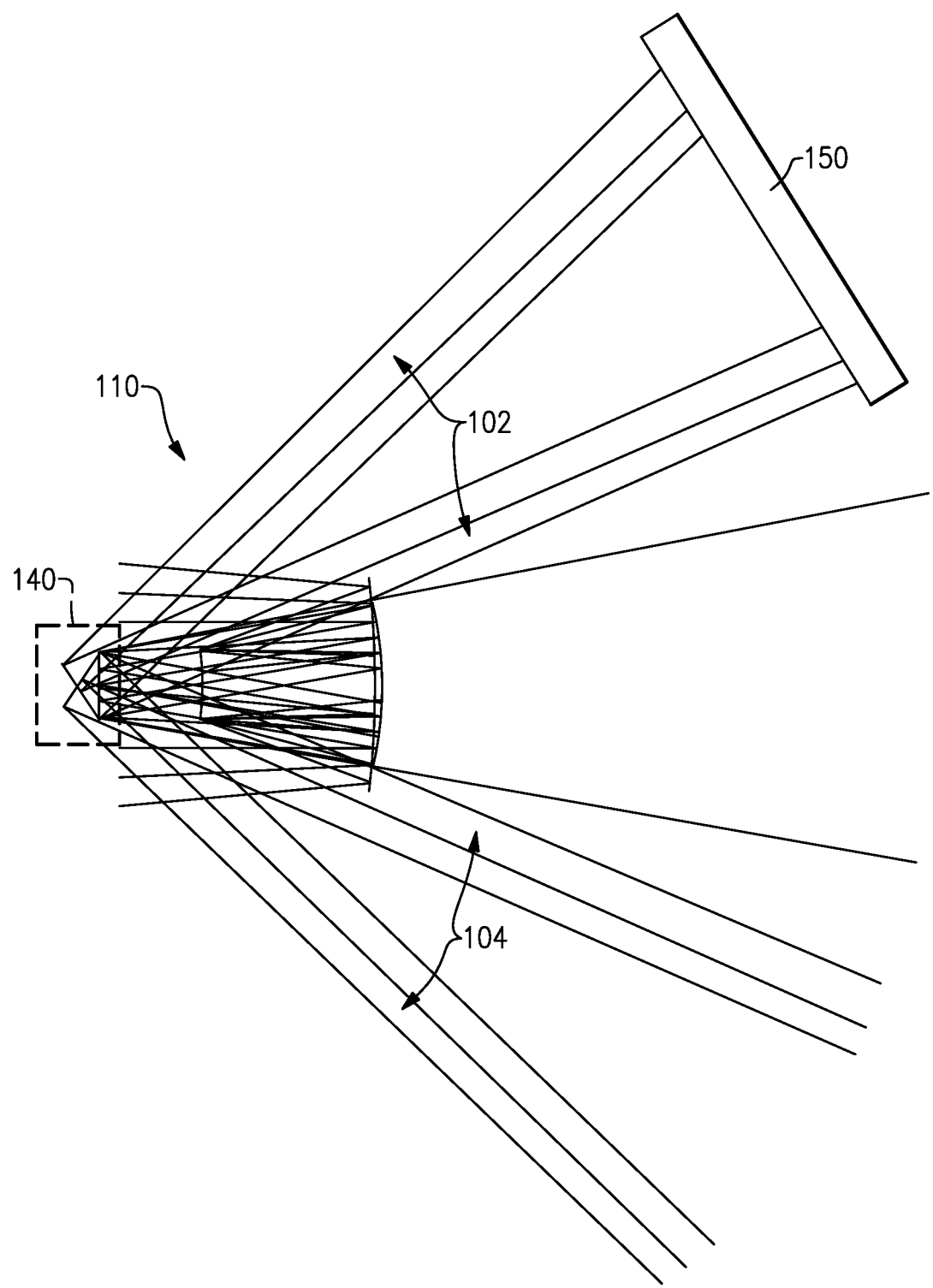
FIG. 6B is a partial ray trace showing operation of an example of the digital micromirror array according to aspects of the present invention.

According to certain examples, the light rays 102 representing the image of the Sun can be directed by the solar rejection optical component 140 to a thermal management component 150, such as a heat sink, as shown in FIG. 6B. In other examples, the light rays 102 can simply be directed away from the coronagraph optical system 100 into free space such that components of the coronagraph optical system 100 are not damaged by the light rays 102.

Referring again to FIG. 4, in certain examples the controller 420 may receive feedback signals from the sensor assembly 130 and can dynamically control the micromirrors 412 of the micromirror array 410 to adapt to changing positions of the Sun within the field of view W of the sensor assembly. For example, if the sensor assembly 130 produces an image of the scene viewed through the field of view W that includes at least a portion of the Sun, the sensor assembly 130 may generate a feedback signal indicating that at least some of the light rays 102 are reaching the sensor assembly via the relay optics assembly 120 instead of being "rejected" (i.e., reflected away) by the solar rejection optical component 140. Accordingly, the controller 420, based on the feedback signal, may control certain ones of the micromirrors 412 of the micromirror array 410 to switch from being in the first position to being in the second position, and optionally switch certain others of the micromirrors 412 from being in the second position to being in the first position in order to adapt to the location of the Sun in the field of view W and better reject the light rays 102 while also capturing the desired image of the scene. In other examples, rather than receiving a feedback signal from the sensor assembly 130, the controller 420 may receive the image of the scene produced by the sensor assembly 130, and analyze the image to determine whether the position of any of the micromirrors 412 should be altered to improve rejection of the light rays 102. In this manner, the coronagraph optical system 100 can dynamically adjust to movement of the Sun within the field of view W without requiring that the system be configured to maintain the Sun centered in the field of view W.

Figure 7:
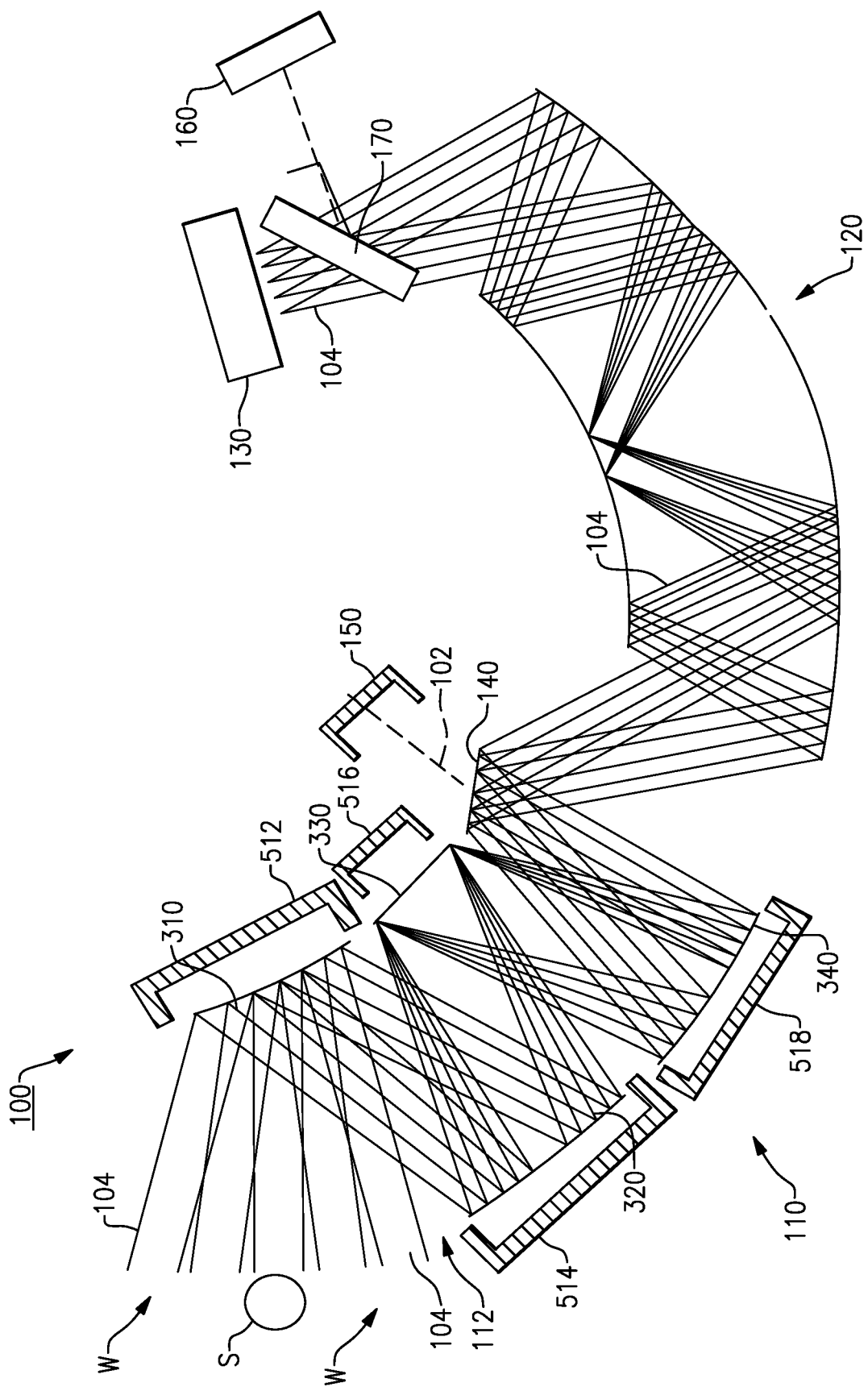
FIG. 7 is a partial ray trace of an example of a coronagraph optical system including a thermal control system in accordance with aspects of the present invention.

According to certain embodiments, a thermal control system can be incorporated into the coronagraph optical system 100 to control the temperature of the coronagraph optical system 100 so that it can continuously reflect the wide field of view W to the sensor assembly 130 (without unacceptable degradation of the various mirrors and the sensor assembly 130). An example of this thermal control system is partially illustrated in FIG. 7. For example, each of the mirrors (310, 320, 330, 340 in the example shown in FIG. 7) of the foreoptics assembly 110 may have an associated heat transfer shroud 512, 514, 516, 518, respectively, operable therewith to remove or extract by radiative means, heat from the mirrors 310, 320, 330, 340. As further discussed below, each shroud 512, 514, 516, 518 can be radiatively coupled to the respective mirrors 310, 320, 330, 340. Each shroud 512, 514, 516, 518 can also be thermally (e.g., directly/physically) coupled to at least one cold radiator (not shown in FIG. 7) to transfer heat away from the mirrors so that the coronagraph optical system 100 can continuously reflect the wide field of view W to the sensor assembly 130.

In certain examples, the coronagraph optical system 100 may include a supplemental sensor 160 (e.g., an imaging sensor) configured to receive the light rays 104 via a beamsplitter 170 positionable within the path of the light rays 104 as reflected from the relay optics assembly 120. The beamsplitter 170 may be a conventional beamsplitter, for example, including a suitable substrate material and a suitable multi-layer dielectric beamsplitter coating on the front surface (i.e., receiving the incident light rays 104 from the relay optics assembly) and a suitable multi-layer dielectric anti-reflection coating on the back side. The supplemental sensor 160 may be similar to the sensor(s) of the sensor assembly 130. In certain examples the supplemental sensor 160 may be used to supply the feedback signal to the controller 420 to control the micromirror array 410. Both the sensor assembly 130 and the supplemental sensor 160 may simultaneously receive the light rays 104 reflected from the relay optics assembly 120.

Figure 8:
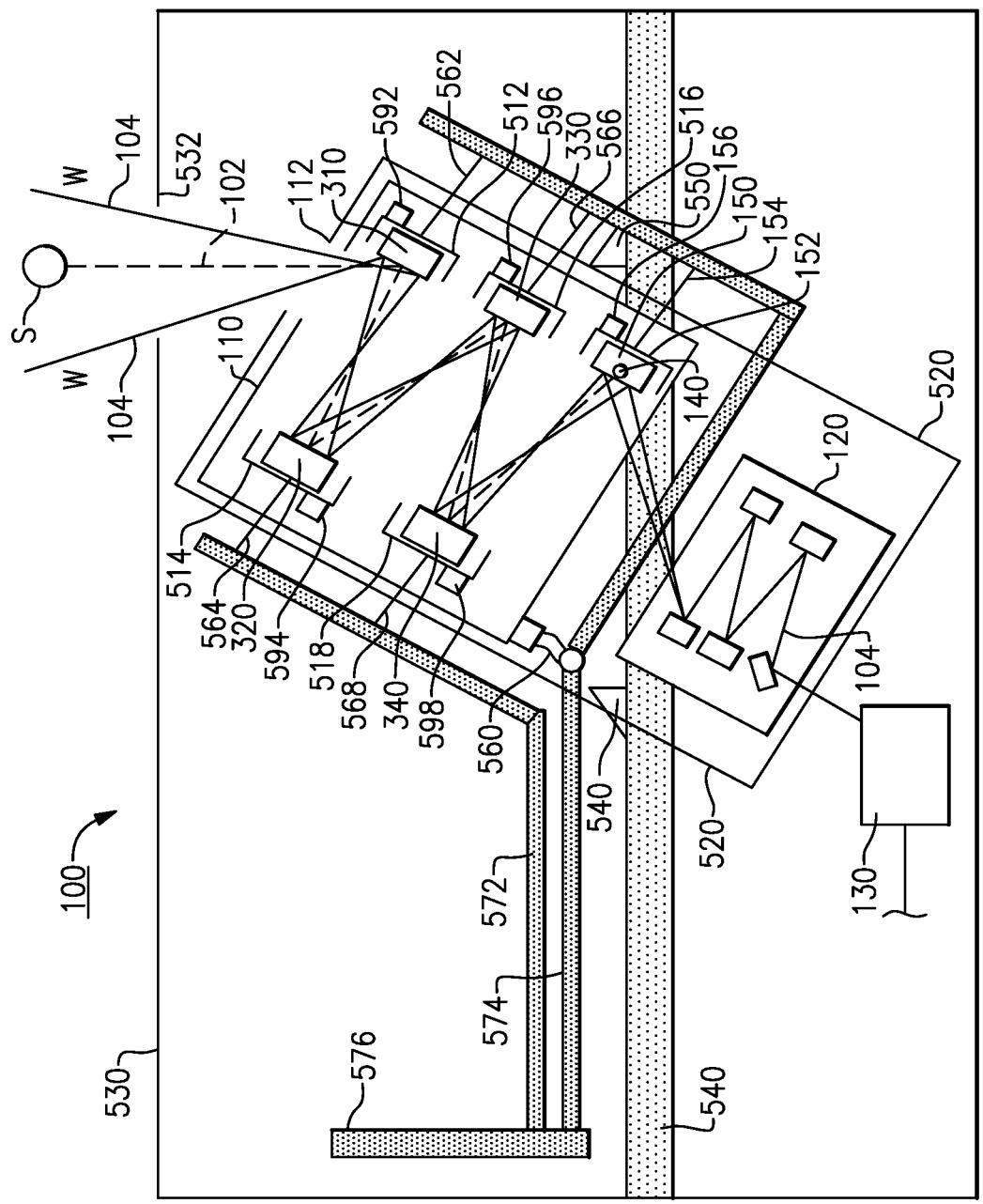
FIG. 8 is a block diagram of another example of a coronagraph optical system including a thermal control system in accordance with aspects of the present invention.

FIG. 8 schematically illustrates another example of the coronagraph optical system 100. As discussed above, the coronagraph optical system 100 includes foreoptics assembly 110 having an entrance aperture 112 positionable towards the Sun S (a thermal load and the direct image of the Sun S is represented by a dashed line corresponding to light rays 102 as discussed above. In the example shown in FIG. 8, the foreoptics assembly 110 includes a plurality of mirrors 310, 320, 330, and 340 that reflect the light rays 104 and 102 (only one or two rays illustrated for illustration clarity). The foreoptics assembly 110 can be positioned within an optical bench 520 that houses and supports the foreoptics assembly 110, the relay optics assembly 120, and the solar rejection optical component 140. As discussed above, the solar rejection optical component 140 directs the light rays 104 to the relay optics assembly 120, which reflects the light rays 104 to the sensor assembly 130. In one example, the relay optics assembly 130 is also housed and supported in the optical bench 520.

In one example, the coronagraph optical system 100 also includes a system optical bench 530 that supports the components of the coronagraph optical system 100 (e.g., the foreoptics assembly 110, the relay optics assembly 120, imaging components, sensors, electronic devices, thermal control system components, the optical bench 520, etc.). The system optical bench 530 can have a real aperture 532 that can be sized to allow passage of the wide field of view W. In one example, a strong back 540 (i.e., a mechanical structure) can be secured to the system optical bench 530, which structurally supports the optical bench 520. In this way, thermally isolating kinematic flexures 550 can secure the optical bench 520 to the strong back 540. The strong back 540 can wrap around a perimeter of the optical bench 520 and be structurally coupled by the thermally isolating kinematic flexures 550.

As discussed above, a thermal control system (or subsystem) can be incorporated into the coronagraph optical system 100 to control the temperature of the coronagraph optical system 100 so that it can continuously reflect the wide field of view W to the sensor assembly 130 without suffering degradation of any and all the mirrors of the coronagraph optical system 100. For example, as discussed above with reference to FIG. 7, each of the mirrors 310, 320, 330, and 340 of the foreoptics assembly 110 can have a heat transfer shroud 512, 514, 516, 518 radiatively coupled to respective mirrors. Each shroud 512, 514, 516, 518 can be comprised of an aluminum (e.g., 6061 T1) shroud painted black to enhance thermal coupling between the shroud and the respective mirror, or any suitable material for the rapid transfer of heat. As discussed above, the solar rejection optical component 140 may include a thermal management component 150, which in certain examples can include a similar heat transfer shroud 152.

According to certain examples, each shroud 512, 514, 516, 518, 152, can also have a flexible heat transfer member 562, 564, 566, 568, 154, respectively, operable therewith, such as a flexible metal strap, that conductively transfers heat away from each shroud 512, 514, 516, 518, 152 to a cold-bias heat pipe 572 or 574, as illustrated in FIG. 8. Both cold-bias heat pipes 572 and 574 can be coupled to a cold radiator 576 that draws heat away from the mirrors 310, 320, 330, 340 (and the optical bench 520), as further discussed below. The cold radiator 576 can provide a cold sink for the transport heat pipes 572 and 574, the flexible heat transfer members 562, 564, 566, 568, and 154, and the shrouds 512, 514, 516, 518, and 152 to dump/remove energy absorbed via the Sun S and surrounding environment such that gas or fluid is cooled at the cold radiator 576 and then caused to be traversed through the heat pipes 572 and 574 in a loop to dump heat, for example.

Figure 9A:
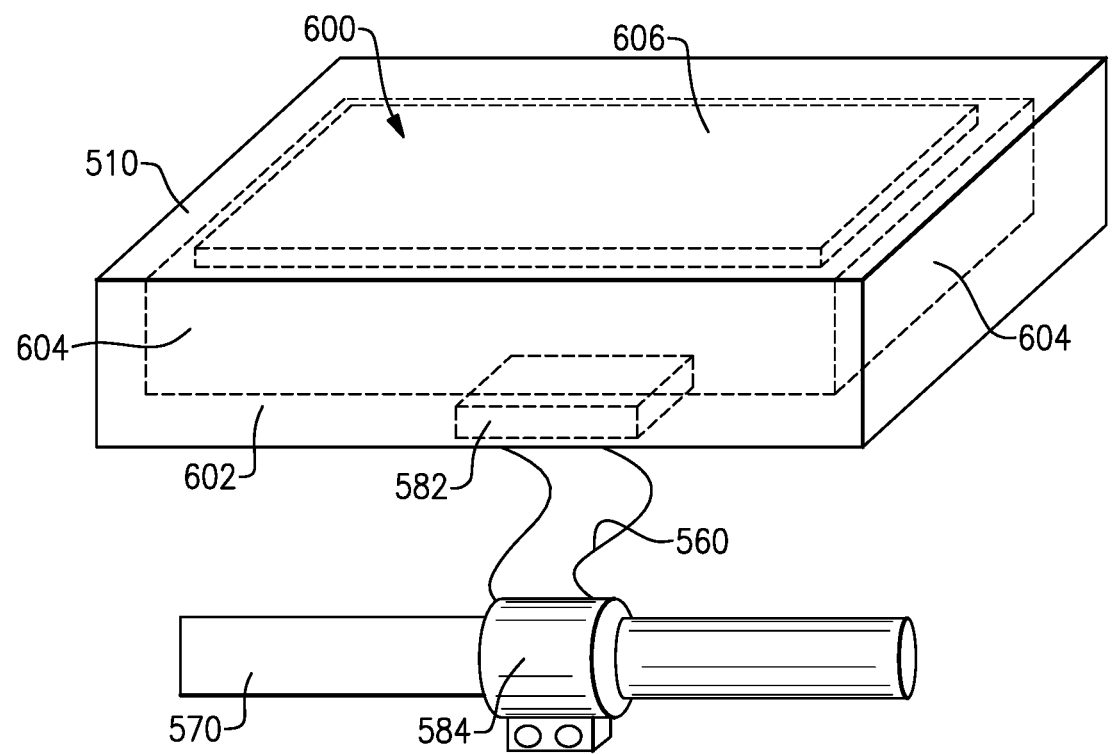
FIG. 9A is a diagram of portion of a thermal control system in accordance with aspects of the present invention.
Figure 9B:
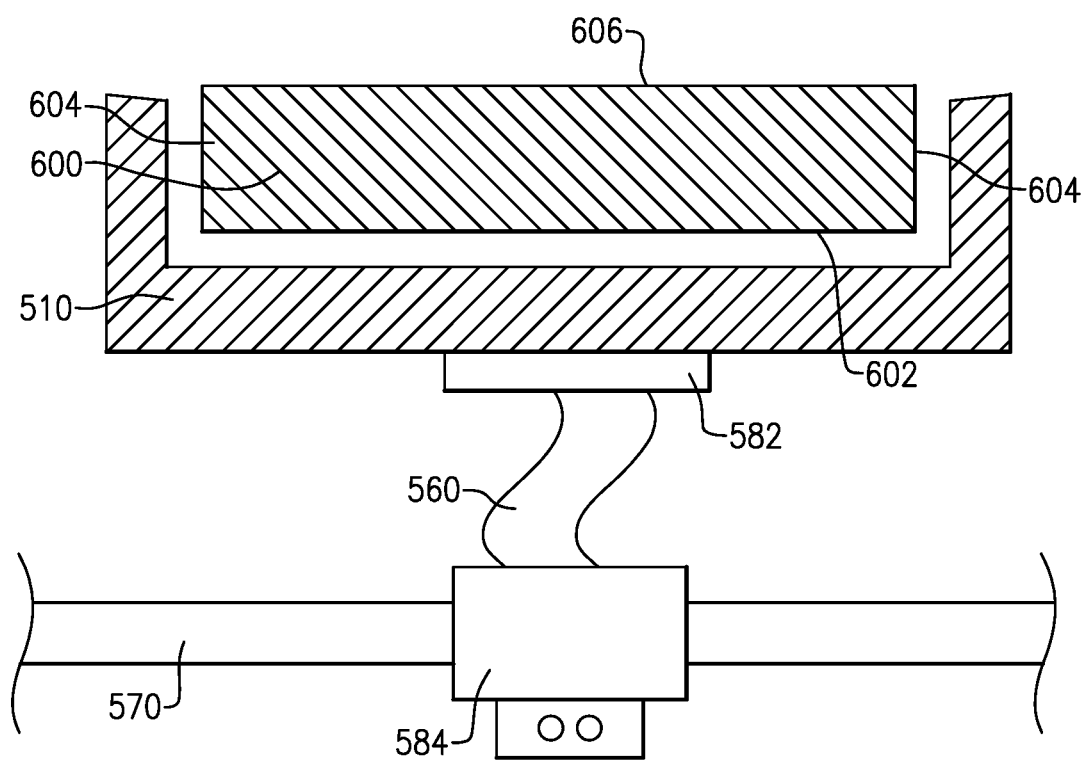
FIG. 9B is another diagram of portion of a thermal control system in accordance with aspects of the present invention.

Referring to FIGS. 9A and 9B, in one example, a mirror 600 (e.g., any of mirrors 310, 320, 330, 340 or mirrors 210, 220, 230) can be spatially surrounded by a shroud 510 situated about the back 602 and sides 604 (all four sides) of the mirror 600. FIG. 9A shows a cross sectional view of the mirror 600 and the shroud 510. As illustrated, the mirror 600 tends to "float" about the shroud 510 (FIG. 9B) while a reflecting surface 606 of the mirror 600 remains exposed. In one example, the mirror 600 can be flexibly mounted to an optical bench in a typical manner of mounting a reflective mirror to an optical bench or other structure (e.g., with a kinematic titanium flexure mount between the bench 520 and the mirror 310, 320, 330, 340, for instance). The shroud 510 can be similarly (or differently) mechanically mounted to the optical bench 520 adjacent the mirror 600, but in such a manner so as to thermally isolate the shroud 510 from the bench 520. This can be accomplished through the use of titanium (or similar) thermal isolators to provide both thermal isolation and compliance. In this manner, the dominant thermal path is not to the optical bench 520, but to the conductive heat transfer member (e.g., 562, 564, 566, 568) and then to the cold-bias heat pipe 572 or 574, and then ultimately to the cold radiator 576.

In one example, a heat transfer member 560 can thermally couple the shroud 510 to a cold-bias heat pipe 570 (e.g., heat pipes 572 or 574 of FIG. 8). In one aspect, a mount member 582 (e.g., a metal bulkhead) can be mounted to the bottom of the shroud 510. One end of the heat transfer member 560 can be coupled to the mount member 582, and the other end of the heat transfer member 560 can be coupled to a pipe mount 584 (or to a metal mount attached to the optical bench 520). Both the mount member 582 and the pipe mount 584 can be comprised of a material (e.g., metal) that thermally conducts heat, such as copper, aluminum, and many other conductive materials. The pipe mount 584 can be two pieces clamped together by fasteners and clamped around the pipe 570, although other physical, thermal couplings are possible. In one example, the heat transfer member 560 can comprise a flexible heat strap made of material that readily transfers heat, such as many metals and metal alloys. The heat transfer member 560 in the form of a flexible heat strap provides (compliance) flexibility between the shroud 510 and the heat transfer pipe 570, wherein the shroud 510 can move (e.g., expand) relative to the heat transfer pipe 570 to account for differing coefficients of thermal expansion (CTEs) between the shroud 510, the heat transfer member 560, and the heat pipe 570.

Referring to FIG. 9B, in one example the entire upper surface area 606 of the mirror 600 conducts heat (downwardly through the mirror) and then radiates continuously to the shroud 510 for drawing heat from the mirror 600 imparted thereon due to the solar thermal load generated on the mirror 600. This "radiative" coupling between the mirror 600 and the shroud 510 is particularly significant when using non-metal mirrors (e.g., silicon carbide, low expansion glass), for instance, because it is undesirable to directly couple thermal conductors (e.g., a metal heat transfer member 560) to such non-metal mirrors because of the large difference in CTEs. That is, the mirror 600 (e.g., one made of silicon carbide, low expansion glass) can have a very low CTE, and the heat transfer member 560 (e.g., one made of aluminum, steel) can have a much higher CTE, so it is advantageous to radiatively couple a component (e.g., a shroud 510) to such mirrors for the purpose of drawing away unwanted heat (including other reasons, such as minimizing or avoiding clamping stresses on the mirror 600). Additionally, radiative coupling between the mirror 600 and the shroud 510 is superior to conventional conductive means (such as straps) in that the radiative path is evenly operative over the entire mirror back surface 602 and provides a more uniform heat flow and temperature than can be achieved with straps, which are more localized, and therefore more non-uniform, in their operation.

Turning back to FIG. 8, each shroud 512, 514, 516, 518, 152 can be thermally (e.g., physically) coupled or linked to the cold radiator 576 via the heat transfer members 562, 564, 566, 568, 154 and the heat pipes 572, 574 to transfer heat away from each respective mirror 310, 320, 330, 340 and the solar rejection optical component 140 so that the system 100 can continuously reflect the wide field of view W to the sensor assembly 130. Note that FIG. 8 schematically shows the heat transfer members 562, 564, 566, 568, 154 extending through the optical bench 520 for purposes of illustration clarity, however a portion of the pipes 572 and 574 may be inside the optical bench 520 and adjacent respective shrouds 512, 514, 516, 518, 152. Various other configurations can achieve the same result of drawing heat away from the mirrors 310, 320, 330, 340 and from the solar rejection optical component 140. For example, the flexible heat transfer members 562, 564, 566, 568, 154 can be directly coupled between the shrouds 512, 514, 516, 518, 152, respectively, and the optical bench 520, and then the cold-bias pipes 572 and 574 can be thermally coupled (e.g., strapped) to the optical bench 520 to draw heat away from the optical bench 520.

Figure 9C:
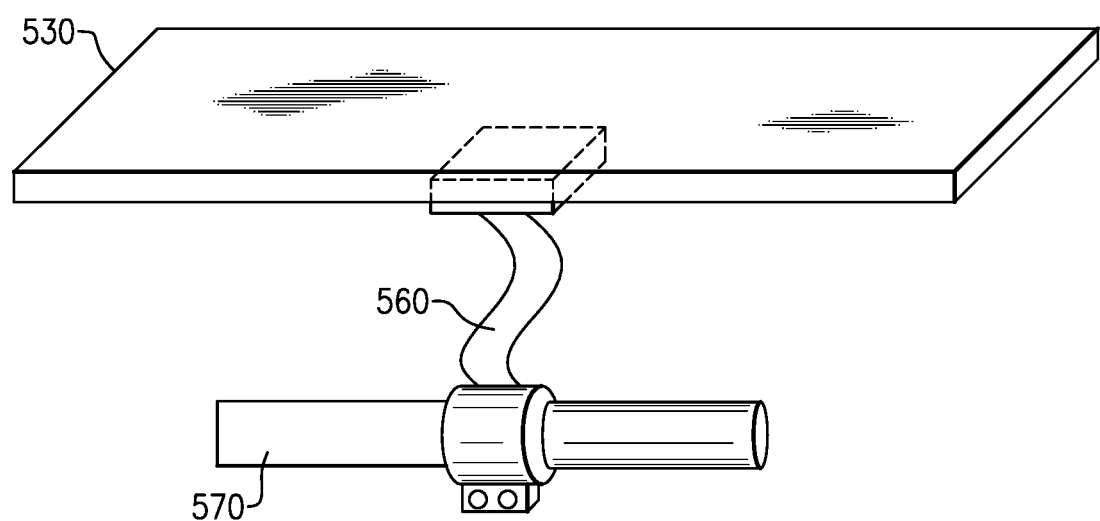
FIG. 9C is another diagram of portion of a thermal control system in accordance with aspects of the present invention.

Further, as shown in FIG. 9C, in certain examples the system optical bench 530 can be thermally coupled to a heat pipe 570 via a flexible heat transfer member 560. Although such configuration could cause optical degradation issues, it is possible to thermally couple the system optical bench 530 to the heat 570 pipe in this manner. Thus, any heat absorbed by the optical bench 530 such as solar heat absorbed by the system optical bench 530 near the entrance aperture 112) can be transferred to the cold-bias radiator 576 by the heat pipe 570.

Thus, according to certain embodiments, as a solar load enters the entrance aperture 112, some of the solar load may be absorbed by the system optical bench 530 and/or the optical bench 520 (e.g., these components may be painted black to absorb some solar load). In some examples, the system optical bench 530 and/or the optical bench 520 are comprised of a low thermal expansion material, such as a low expansion composite (e.g., carbon fiber) having a CTE between −0.8×10-6/K and 1.0×10-6/K. In some examples, the mirrors of the foreoptics assembly 110 can also be comprised of low thermal expansion material, such as silicon carbide (having a CTE of approximately 2.4 E-6/K), or ultra-low expansion glass (having a CTE of approximately 10 E-8/K at 5-35° C.). Of note, "ultra-low expansion glass" or "ULE Glass®" is marketed under a trademark owned by Corning, Inc. Accordingly, the system optical bench 530 and/or the optical bench 520 can absorb some solar load, and the remaining solar load can be progressively absorbed about each of the mirrors of the foreoptics assembly 110, until the final/remaining solar load is passed to the solar rejection optical component 140 where it can be reflected away in a direction where there are no system components that could be damaged or absorbed by the thermal management component 150. Thus, virtually no solar load (or negligible load) is transferred to the relay optics assembly 120 or the sensor assembly 130. In one example, the mirrors of the relay optics assembly 120 can be comprised of aluminum or beryllium, for example, (i.e., having a higher CTE than the mirrors of the foreoptics assembly 110) as virtually no solar load is imparted to relay optics assembly 120.

In one example, at the primary mirror 310, about 2-5 Watts of power can be absorbed by the mirror 310 from the solar load entering the optical bench 520, and this absorbed solar load can be radiatively transferred to the shroud 512, and then eventually (conductively) transferred to the cold radiator 576 (as discussed above) by way of the heat pipe(s) 572 and/or 574. This heat transfer process continues at each mirror 320, 330, and 340 such that, at each mirror, at least some (e.g., about 5%) of the solar load is progressively removed before being reflected to the solar rejection optical component 140. Thus, once the light rays 104 and the direct solar image 102 are received at the quaternary mirror 340 (i.e., the final mirror of foreoptics assembly 110), an amount of solar load remains (e.g., up to about 80% of the original solar load can remain). The remaining solar load reflected by the quaternary mirror 340 can be substantially (or entirely) removed by the solar rejection optical component 140.

Referring again to FIG. 8, according to certain embodiments, heaters 592, 594, 596, 598 and 156 can be coupled to the respective shroud 512, 514, 516, 518 and 152 to provide a sink temperature so that the optical components are controlled to a particular desired temperature, such as 20 degrees Celsius, for example. Thus, each heater 592, 594, 596, 598 and 156 can have a feedback temperature sensor associated with the respective optical component to indicate the operating temperature of the associated component. in some examples, the mirrors 310, 320, 330, and 340 may operate at about 20 degrees Celsius (to avoid degradation and provide a healthy telescope with acceptable wavefront errors, for instance). The respective shroud 512, 514, 516, 518 may then operate at approximately 5-10 degrees Celsius, and the respective heat pipe 572, 574 may operate at 0 degrees Celsius, for example. However, removing heat from each mirror 310, 320, 330, 340 via the cold radiator 576, for instance, may result in the mirror(s) operating "too cold" (i.e., well-below 20 degrees Celsius), which can affect image quality, etc. Thus, the heaters 592, 594, 596, 598 can be controlled (e.g., by a computer system) to provide a predetermined amount of heat to each mirror 310, 320, 330, 340 to operate at or near and to maintain ideal operating temperatures (e.g., 20 degrees Celsius). Similarly, the combination of the heat removal components discussed above and the heater 156 can ensure a desired or optimal operating temperature for the solar rejection optical component 140. Individually controlling the temperature of the mirrors in the foreoptics assembly 110 may be advantageous because the primary mirror 310 receives more solar load than the quaternary mirror 340, for instance, and therefore controlling the operating temperature at each particular mirror 310, 320, 330, 340 with a respective heater 592, 594, 596, 598 may help to reflect an image to the sensor assembly 130 that is not distorted. The heaters 592, 594, 596, 598 may also be advantageous when there is a solar eclipse, for instance, where the mirrors of the foreoptics assembly 110 may be operating much "too cold" and the heaters can be operable to heat the mirrors in needed circumstances to facilitate operation of the mirrors and the imaging system at healthy, steady temperature levels (e.g., 20 degrees Celsius). Generally, "a healthy telescope" may refer to a telescope that can reflect light rays and a solar image with an acceptably small amount of degradation of optical components of the system such that a detector/sensor can effectively receive and transmit an acceptable image for typical processing and analysis, for instance. The image quality of "a healthy telescope" is very nearly that of the ideal telescope design as implemented in hardware, and is capable of operating successfully relative to its intended purpose.

Embodiments of the thermal control system can control the temperature at each mirror (as discussed above) to provide a steady state at each mirror to minimize wavefront error. For instance, each mirror can (uniformly and steadily) absorb 2 Watts of power, for instance. (e.g., due to the shroud and heater), which minimizes the gradient error on the mirror, which therefore minimizes surface figure error and minimizes wavefront error within the optical system.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A coronagraph optical system for continuously imaging a wide field of view, the coronagraph optical system comprising:

an all-reflective foreoptics assembly having an entrance aperture positionable towards the Sun and configured to receive light rays over the wide field of view, the all-reflective foreoptics assembly including a plurality of foreoptics mirrors that receive the light rays via the entrance aperture and sequentially reflect the light rays, the light rays including first light rays from a viewed scene and second light rays corresponding to a direct solar image of the Sun;

a sensor assembly including at least one photosensitive detector and configured to produce an image of the viewed scene based on the first light rays;

an all-reflective relay optics assembly configured to receive the first light rays from the all-reflective foreoptics assembly and to reflect the first light rays to the sensor assembly; and a solar rejection optical component positioned between the all-reflective foreoptics assembly and the all-reflective relay optics assembly and dynamically configurable such that the direct solar image of the Sun, reflected by the all-reflective foreoptics assembly to the solar rejection optical component, is reflected away from the all-reflective relay optics assembly and the first light rays are reflected to the all-reflective relay optics assembly while the entrance aperture of the all-reflective foreoptics assembly is continuously positioned towards the Sun, wherein the plurality of foreoptics mirrors consists of
a primary mirror that receives the light rays from the entrance aperture and reflects the light rays,
a secondary mirror that receives the light rays reflected from the primary mirror and reflects the light rays,
a tertiary mirror that receives the light rays reflected from the secondary mirror and reflects the light rays, and
a quaternary mirror that receives the light rays reflected from the tertiary mirror and reflects the light rays to the solar rejection optical component.

2. The coronagraph optical system of claim 1 wherein the wide field of view is between 5 degrees and 30 degrees.

3. The coronagraph optical system of claim 1 wherein the all-reflective relay optics assembly is a five-reflection finite conjugate relay system.

4. The coronagraph optical system of claim 1 wherein the solar rejection optical component includes a dynamically controllable micromirror array.

5. The coronagraph optical system of claim 4 wherein the dynamically controllable micromirror array includes a plurality of micromirrors, each micromirror being individually controllable between a first position in which incident light is reflected in a first direction and a second position in which the incident light is reflected in a second direction, there being a predetermined angular separation between the first direction and the second direction.

6. The coronagraph optical system of claim 1 wherein the at least one photosensitive detector includes at least one of a longwave infrared focal plane array and a visible focal plane array.

7. A coronagraph optical system for continuously imaging a wide field of view, the coronagraph optical system comprising:
an all-reflective foreoptics assembly having an entrance aperture positionable towards the Sun and configured to receive light rays over the wide field of view, the all-reflective foreoptics assembly including a plurality of foreoptics mirrors that receive the light rays via the entrance aperture and sequentially reflect the light rays, the light rays including first light rays from a viewed scene and second light rays corresponding to a direct solar image of the Sun;

a sensor assembly including at least one photosensitive detector and configured to produce an image of the viewed scene based on the first light rays;

an all-reflective relay optics assembly configured to receive the first light rays from the all-reflective foreoptics assembly and to reflect the first light rays to the sensor assembly; and a solar rejection optical component positioned between the all-reflective foreoptics assembly and the all-reflective relay optics assembly and dynamically configurable such that the direct solar image of the Sun, reflected by the all-reflective foreoptics assembly to the solar rejection optical component, is reflected away from the all-reflective relay optics assembly and the first light rays are reflected to the all-reflective relay optics assembly while the entrance aperture of the all-reflective foreoptics assembly is continuously positioned towards the Sun, wherein the solar rejection optical component includes a dynamically controllable micromirror array, wherein the dynamically controllable micromirror array includes a plurality of micromirrors, each micromirror being individually controllable between a first position in which incident light is reflected in a first direction and a second position in which the incident light is reflected in a second direction, there being a predetermined angular separation between the first direction and the second direction, and wherein the solar rejection component further includes a controller coupled to the dynamically controllable micromirror array and to the sensor assembly, the controller being configured to dynamically switch individual ones of the plurality of micromirrors between the first position and the second position based on information received from the sensor assembly so as to reflect the direct solar image of the Sun away from the all-reflective relay optics assembly while the entrance aperture of the all-reflective foreoptics assembly is continuously positioned towards the Sun.

8. A coronagraph optical system for continuously imaging a wide field of view, the coronagraph optical system comprising:
an all-reflective foreoptics assembly having an entrance aperture positionable towards the Sun and configured to receive light rays over the wide field of view, the all-reflective foreoptics assembly including a plurality of foreoptics mirrors that receive the light rays via the entrance aperture and sequentially reflect the light rays, the light rays including first light rays from a viewed scene and second light rays corresponding to a direct solar image of the Sun;

a sensor assembly including at least one photosensitive detector and configured to produce an image of the viewed scene based on the first light rays;

an all-reflective relay optics assembly configured to receive the first light rays from the all-reflective foreoptics assembly and to reflect the first light rays to the sensor assembly;

a solar rejection optical component positioned between the all-reflective foreoptics assembly and the all-reflective relay optics assembly and dynamically configurable such that the direct solar image of the Sun, reflected by the all-reflective foreoptics assembly to the solar rejection optical component, is reflected away from the all-reflective relay optics assembly and the first light rays are reflected to the all-reflective relay optics assembly while the entrance aperture of the all-reflective foreoptics assembly is continuously positioned towards the Sun;
    a thermal control subsystem coupled to the all-reflective foreoptics assembly, the thermal control subsystem transferring away heat such that the entrance aperture can be continuously positioned towards the Sun, the thermal control subsystem including a plurality of heat transfer shrouds, each heat transfer shroud radiatively coupled to one of the plurality of foreoptics mirrors for transferring the heat; and
    an optical bench containing the plurality of foreoptics mirrors and at least one cold-bias heat pipe, wherein the thermal control subsystem includes a plurality of heat transfer members each thermally coupled to one of the heat transfer shrouds and to the optical bench, and wherein the plurality of heat transfer members are thermally coupled to the at least one cold-bias heat pipe.

9. The coronagraph optical system of claim 8 wherein the plurality of foreoptics mirrors and the optical bench are each comprised of a low thermal expansion material selected from the group consisting of silicon carbide, low expansion glass, and low expansion composite.

10. The coronagraph optical system of claim 8 wherein the thermal control subsystem further includes a plurality of heaters thermally coupled to each of the plurality of foreoptics mirrors for controlling a temperature of the all-reflective foreoptics assembly.

11. The coronagraph optical system of claim 8 wherein the thermal control subsystem includes a thermal management component coupled to the solar rejection optical component.

12. A method of imaging a viewed scene that includes the Sun, the method comprising:
    positioning an entrance aperture of an all-reflective foreoptics assembly towards the Sun;
    receiving at the all-reflective foreoptics assembly, via the entrance aperture, light rays from the viewed scene and a direct solar image of the Sun;
    reflecting the light rays and the direct solar image of the Sun from the all-reflective foreoptics assembly to a solar rejection optical component;
    dynamically controlling the solar rejection optical component to reflect the light rays to an all-reflective relay optics assembly and to reflect the direct solar image of the Sun away from the all-reflective relay optics assembly while the entrance aperture of the foreoptics assembly is positioned towards the Sun;
    reflecting the light rays from the relay optics assembly to a sensor assembly; and
    with the sensor assembly, producing an image of the viewed scene from the light rays,
    wherein the foreoptics assembly consists of
        a primary mirror that receives the light rays from the entrance aperture and reflects the light rays,
        a secondary mirror that receives the light rays reflected from the primary mirror and reflects the light rays,
        a tertiary mirror that receives the light rays reflected from the secondary mirror and reflects the light rays, and
    a quaternary mirror that receives the light rays reflected from the tertiary mirror and reflects the light rays to the solar rejection optical component.

13. The method of claim 12 wherein the solar rejection optical component includes a micromirror array formed of a plurality of micromirrors and wherein dynamically controlling the solar rejection optical component includes dynamically switching individual ones of the plurality of micromirrors between a first position in which incident light is reflected towards the all-reflective relay optics assembly and a second position in which the incident light is reflected away from the all-reflective relay optics assembly.

* * * * *